United States Patent
Theuer

(10) Patent No.: US 6,274,179 B1
(45) Date of Patent: Aug. 14, 2001

(54) PROANTHOCYANIDIN-FREE BARLEY FOOD COMPOSITION FORTIFIED WITH IRON AND METHODS OF MAKING AND USING

(76) Inventor: Richard C. Theuer, 7904 Sutterton Ct., Raleigh, NC (US) 27615

( * ) Notice: Subject to any disclaimer, the term of this patent is extended or adjusted under 35 U.S.C. 154(b) by 0 days.

(21) Appl. No.: 09/501,906

(22) Filed: Feb. 10, 2000

(51) Int. Cl.$^7$ ............................... A23L 1/304; A23L 1/10
(52) U.S. Cl. ........................ 426/74; 426/618; 426/619; 426/622; 426/801
(58) Field of Search ........................ 426/74, 801, 618, 426/619, 622

(56) References Cited

U.S. PATENT DOCUMENTS

| | | |
|---|---|---|
| 3,506,447 | 4/1970 | Billerbeck et al. . |
| 3,956,506 * | 5/1976 | Cloud et al. ........................ 426/28 |
| 4,165,387 | 8/1979 | von Wettstein et al. . |
| 5,053,235 * | 10/1991 | Alley et al. ........................ 426/74 |
| 5,459,162 * | 10/1995 | Saxton ................. 514/499 |
| 5,670,344 | 9/1997 | Mehansho et al. . |

OTHER PUBLICATIONS

DeMaeyer et al., "Foreword," in "Iron Fortification of Foods," Clydesdale and Wiemer, editors, Academic Press, 1985, pp. xi–xii.
Beard et al., "Iron Deficiency," Chapter 1 in "Iron Fortification of Foods," Clydesdale and Wiemer, editors, Academic Press, 1985, pp. 3–16.
Hallberg, "Factors Influencing the Efficacy of Iron Fortification and the Selection of Fortification Vehicles," Chapter. 2 in "Iron Fortification of Foods," Clydesdale and Wiemer, editors, Academic Press, 1985, pp. 17–28.
Hurrell, "Nonelemental Sources," Chapter 4 in "Iron Fortification of Foods," Clydesdale and Wiemer, editors, Academic Press, 1985, pp. 39–53.
Barrett and Ranum, "Wheat and Blended Cereal Foods," Chapter 6 in "Iron Fortification of Foods," Clydesdale and Wiemer, editors, Academic Press, 1985, pp. 75–109.
Bravo, "Polyphenols: Chemistry, Dietary Sources, Metabolism and Nutritional Significance," Nutrition Reviews, vol. 56, pp. 317–333, 1998.
Committee on Nutrition, American Academy of Pediatrics, "Supplemental Foods for Infants," Chapter 3 in Pediatric Nutrition Handbook, Second Edition, 1985, pp. 28–36.
Food and Nutrition Board, National Research Council, "Proposed Fortification Policy for Cereal–Grain Products," Washington, DC, 1974, p. 36.
Hurrell "Preventing Iron Deficiency Through Food Fortification," Nutrition Reviews, vol. 55, pp. 210–222, 1997.
Hurrell et al., "Iron fortification of infant cereals: a proposal for the use of ferrous fumarate or ferrous succinate," American Journal of Clinical Nutrition, vol. 49, pp. 1274–1282, 1989.
Hurrell et al., Ferrous fumarate fortification of a chocolate drink powder, British Journal of Nutritioin, vol. 65, pp. 271–283, 1991.
Layrisse et al., "Early response to the effect of iron fortification in the Venezuelan population," American Journal of Clinical Nutritiion, vol. 64, pp. 903–907, 1996.
Ziegler et al., "Strategies for the Prevention of Iron Deficiency: Iron in Infant Formulas and Baby Foods," Nutrition Reviews, vol. 54, pp. 348–354, 1996.
U.S. Food and Drug Administration, Code of Federal Regulations, Title 21, Part 137: "Cereal Flours and Related Products.".
Jende–Strid, "Coordinator's Report: Anthocyanin genes (1995)," http://greengenes.cit.cornell.edu/bgn/v24p162.html.
Jende–Strid, "Coordinator's Report: Anthocyanin genes (19967)," http://greengenes.cit.cornell.edu/bgn/bgn25/v25p116.html.

* cited by examiner

Primary Examiner—Helen Pratt
(74) Attorney, Agent, or Firm—Harness, Dickey & Pierce; Donald R. Holland

(57) ABSTRACT

Disclosed are food compositions containing proanthocyanidin-free barley and a nutritionally effective amount of an iron compound in an organoleptically acceptable composition. The proanthocyanidin-free barley food composition does not develop the gray color seen with typical commercially available barley flour compositions to which an iron compound has been added. Also disclosed are methods of making the food composition and methods for restoring nutritional iron balance by feeding the food compositions to an individual having iron deficiency.

18 Claims, No Drawings

PROANTHOCYANIDIN-FREE BARLEY FOOD COMPOSITION FORTIFIED WITH IRON AND METHODS OF MAKING AND USING

BACKGROUND OF THE INVENTION (1) Field of the Invention

This invention relates to food compositions containing barley and, more particularly, to food compositions comprising proanthocyanidin-free barley and iron. The iron-fortified composition is organoleptically acceptable and does not possess the grayish color typical of iron-fortified barley compositions.

(2) Description of the Related Art

Iron deficiency continues to be a significant world health problem in both developing and industrialized countries. Particularly affecting are infants, toddlers, pregnant women, and menstruating women (see DeMaeyer et al. in *Iron Fortification of Foods*, Clydesdale and Wiemer, Eds, Academic Press, 1985, pp. xi–xii; Beard et al. in *Iron Fortification of Foods*, Clydesdale and Wiemer, Eds, Academic Press, 1985, pp. 3–16). Fortification of foods with iron can be an effective means of avoiding or overcoming iron deficiency (Hurrell, *Nutrition Rev.* 55:210–222, 1997). Cereal-based foods are the most commonly used vehicles for fortification with iron because of their stability as a carrier for nutrients and their broad usage (Proposed Fortification Policy for Cereal-Grain Products, National Research Council, Food and Nutrition Board, 1974).

Infants are particularly susceptible to iron deficiency because of their rapid growth rate and the relatively low iron content of most foods that have not been fortified. As a result, iron deficiency is the most prevalent nutritional deficiency among infants and young children (Ziegler, et al, *Nutrition Rev.* 54:348–354, 1996). The fortification of infant formulas and cereals has been advocated as a strategy for preventing iron deficiency in infants (Id.).

One problem often associated with the addition of iron to food products has been the development of undesirable organoleptic qualities of the food due to unacceptable changes in color and flavor (Hurrell, *Nutrition Rev* 55:210–222, 1997). For example, ferrous fumarate has been studied for its possible use in fortifying chocolate milk drinks, however, the powdered chocolate milk product turned an unattractive gray color when reconstituted with boiling water or boiling milk (Hurrel et al., *British J. Nutrition* 65:271–283, 1991). Similar undesirable color changes can occur in infant cereals when the cereal is made into a pap with milk or water (Hurrell et al. *Am J. Clin Nutr* 49:1274–1282, 1989).

Phenolic compounds in infant cereals have been implicated in the color changes resulting from the addition of iron compounds (Hurrell, 1997, supra). It has been reported that Ferrous sulfate can react with phenolic compounds to form blue-black colors and darken food products containing large amounts of tannin, like chocolate and barley flour (Barrett et al. in *Iron Fortification of Foods*, Clydesdale and Wiemer, Eds, Academic Press, 1985, pp. 75–109 citing Waddel, The Bioavailability of Iron Sources and their Utilization in Food Enrichment, *FASEB Report for the FDA*, Bethesda, Md., 1973). Nevertheless, these earlier works did not identify any particular compounds responsible for the discoloration of food products upon addition of iron. Indeed, phenolic compounds, of which the group of compounds referred to as tannins have been considered one type, constitute a wide range of compounds (Bravo, *Nutrition Rev.* 56:317–333, 1998).

Currently, one of the more popular commercial instant infant cereals is barley Cereal. barley, however, is unique among the common cereal grains of North America in that it is especially rich in polyphenolic compounds, including tannins (Bravo, 1998, supra). Barley is reported to contain 1200 to 1500 mg total polyphenols per 100 grams of dry weight, compared to 22 to 40 mg for wheat, 30.9 mg for corn, 8.7 mg for oats and 8.6 mg for rice (Id.). As a result, barley cereal made with electrolytic iron, which is commonly used to fortify instant infant cereals (Ziegler et al., 1996, supra), has a tendency to turn gray during manufacture and during reconstitution by the consumer unless the electrolytic iron is encapsulated in a water-insoluble matrix (see example 1 below).

One approach to avoiding the iron discoloration of food products has been to adjust the pH of the food product to an acidic value. Mehansho et al. (U.S. Pat. No. 5,670,344) reported that the development of gray color in a chocolate drink product upon reconstitution with water or milk, is prevented by buffering the chocolate drink product to a pH of 6.5 or less. Cereal-based foods made with barley, however, do not react in the same manner as chocolate and adjusting the pH of a barley flour mixture with added iron, does not prevent the graying of the composition at acceptable levels of acidity (see example 2 below).

Thus, it would be desirable to devise a workable approach for fortifying barley-containing food products with iron without the development of a an organoleptically unacceptable discoloration of the food product.

BRIEF DESCRIPTION OF THE INVENTION

Accordingly, the inventor herein has succeeded in discovering that an organoleptically acceptable food composition can be prepared which comprises barley and a nutritionally effective amount of an iron compound. Surprisingly, when using a proanthocyanidin-free barley, iron could be added without producing the undesirable gray color which typically results when adding iron to proanthocyanidin-containing barley. The compositions of the present invention are particularly applicable to infant food compositions.

Thus, in one embodiment, the present invention comprises a food composition of at least about 10% (w/w, dry basis) barley and a nutritionally effective amount of an iron compound in an organoleptically acceptable formulation. The barley is, preferably, a proanthocyanidin-free barley, preferably from one of the varieties, Caminant, Chamant, Gant, Clarity or Brite or from a combination thereof. Most preferably, the barley is from the Caminant variety.

The iron compound can be present in an amount to produce a level of from about 3 to about 50 mg iron per 100 g (w/w, dry basis). Preferably, the iron compound is ferrous sulfate, ferric sulfate, ferrous gluconate, ferrous lactate, ferric ammonium citrate, ferric saccharate, ferrous saccharate, ferric citrate, ferrous citrate, ferrous amino acid chelates, ferrous fumarate, ferrous succinate, ferrous tartrate, elemental iron powders made by carbonyl, electrolytic or reduction techniques, ferric pyrophosphate, ferric orthophosphate, ferric ammonium orthophosphate, or mixtures thereof. Most preferably, the iron compound is ferrous fumarate.

In another embodiment, the present invention comprises a method for making an organoleptically acceptable barley food composition fortified with iron. The method comprises combining at least about 10% (w/w, dry basis) barley composition with a nutritionally effective amount of an iron compound. The barley is, preferably, a proanthocyanidin-free barley, preferably from one of the varieties, Caminant, Chamant, Gant, Clarity or Brite or from a combination thereof. Most preferably, the barley is from the Caminant variety.

The iron compound can be present in the prepared composition in an amount to produce a level of from about 3 to about 50 mg iron per 100 g (w/w, dry basis). Preferably, the iron compound added is ferrous sulfate, ferric sulfate, ferrous gluconate, ferrous lactate, ferric ammonium citrate, ferric saccharate, ferrous saccharate, ferric citrate, ferrous citrate, ferrous amino acid chelates, ferrous fumarate, ferrous succinate, ferrous tartrate, elemental iron powders made by carbonyl, electrolytic or reduction techniques, ferric pyrophosphate, ferric orthophosphate, ferric ammonium orthophosphate, or mixtures thereof. Most preferably, the iron compound is ferrous fumarate.

The present invention, in yet another embodiment comprises a method for restoring iron balance in an individual having iron deficiency. The method comprises feeding the individual a food composition comprising at least about 10% (w/w, dry basis) barley and a nutritionally effective amount of an iron compound in an organoleptically acceptable formulation. The barley is, preferably, a proanthocyanidin-free barley, preferably, from one of the varieties, Caminant, Chamant, Gant, Clarity or Brite or from a combination thereof. Most preferably, the barley is from the Caminant variety.

The iron compound can be present in an amount to produce a level of from about 3 to about 50 mg iron per 100 g (w/w, dry basis). Preferably, the iron compound is ferrous sulfate, ferric sulfate, ferrous gluconate, ferrous lactate, ferric ammonium citrate, ferric saccharate, ferrous saccharate, ferric citrate, ferrous citrate, ferrous amino acid chelates, ferrous fumarate, ferrous succinate, ferrous tartrate, elemental iron powders made by carbonyl, electrolytic or reduction techniques, ferric pyrophosphate, ferric orthophosphate, ferric ammonium orthophosphate, or mixtures thereof. Most preferably, the iron compound is ferrous fumarate.

Among the several advantages achieved by the present invention, therefore, may be noted the provision of a new barley food composition that does not develop a grayish color upon addition of iron; the provision of a new barley-containing food composition which can serve as a vehicle for nutritional dietary supplementation with iron; the provision of a method from making an organoleptically acceptable barley food composition fortified with iron; and the provision of a method for restoring iron balance in individuals having iron deficiency.

DETAILED DESCRIPTION OF THE INVENTION

In accordance with the present invention, it has been discovered that proanthocyanidin-free barley which has been developed for the brewing industry makes an excellent replacement for conventional barley in human food applications. Food compositions containing proanthocyanidin-free barley serve as vehicles for essential nutrients such as iron.

Barley is the edible seed as well as the edible grain of any variety of the cereal grass species "*Hordeum vulgare*." As used herein in the context of a component of a food composition, the term "barley" is intended to include any of a variety of processed food ingredients made from barley seed or grain such as, for example, pearl barley, barley flour, malted barley, malted barley flour, barley malt extract, and the like.

The food composition of the present invention contains barley as one of its components in an amount of, preferably, at least about 5% (w/w, dry basis), more preferably, at least about 10% (w/w, dry basis), more preferably, at least about 20% (w/w, dry basis), more preferably, at least about 50% (w/w, dry basis) and more preferably about 100% (w/w, dry basis). The term "about" as used herein is intended to cover a range of values from 10% below a given value to 10% above a given value. For example, about 10% is intended to mean a range of values from 9% to 11%. The term "w/w, dry basis" is intended to mean the weight of an added component per total weight of the food composition prior to the addition of water. For example, the dry weight of a barley flour is the weight of the ground flour. For iron compounds, the dry weight is that weight of the compound including any water of molecular hydration, in the absence of additional water that would form a solution or suspension.

As noted above, wild-type barley varieties contain numerous phenolic and polyphenolic compounds (Bravo, supra). Simple phenols and flavenoids represent the vast majority of plant phenolics, however, plant phenolics also include a group of intermediate to high molecular weight polymers referred to as tannins. The tannins react with protein and other macromolecules such as starch, cellulose and minerals to form stable complexes, a quality of these compounds for which they have been known and used in the transforming of animal hides into leather. Tannins can be further subdivided into two major groups, (1) hydrolyzable tannins which include gallotannins and ellagigannins and (2) condensed tannins or proanthocyanidin. Prior to the studies reported herein, it was not known which plant phenolics were responsible for the production of gray color upon addition of iron to barley nor was it known that proanthocyanidin-free barley does not develop such gray color upon addition of iron.

The development of proanthocyanidin-free barley has been largely a result of efforts of the brewing industry. Proanthocyanidins are found in regular barley malt and in hops. Proanthocyanidins combine with certain proteins in malt during the mashing, wort boiling and fermentation processes involved in brewing beer. The proanthocyanidin-protein complex is responsible for colloidal instability and haze in beer. Complex separation schemes are required to remove this complex from beer. In order to avoid the formation of proanthocyanidin-protein complex and to facilitate brewing colloidally stable beer, plant breeders, in particular, those at the Carlsberg Research Center of Carlsberg Brewery in Copenhagen, Denmark, have developed proanthocyanidin-free barley varieties in a plant breeding program. Sejet Plantbreeding, Horsens, Denmark, markets the seed of the proanthocyanidin-free variety Caminant. Proanthocyanidin-free varieties include, but are not limited to the Caminant, Chamanat, Gant, Clarity and Brite varieties of barley.

A number of proanthocyanidin-free mutants have been made the more important of which have mutations in the Ant gene loci, Ant 13, Ant 17, Ant 18, Ant 26, Ant 27 and Ant 28. The Caminant variety is an Ant 28/484 allele developed in 1992. Unlike the Ant 13 mutant developed in 1979, which is deficient in both anthocyanin and proanthcyanidin synthesis due to a deficiency in structural genes in the flavonoid pathway, the Ant 28 mutants are deficient in proanthocyanidin and not anthocyanin as a result of blockage of the last stages of proanthocyanidin synthesis. Thus the Ant 28 mutants contain wild-type amounts of anthocyanin.

By proanthocyanidin-free barley, it is meant that the barley is substantially free of proanthocyanidin as is exemplified by one of the above proanthocyanidin-free varieties recognized as such in the art.

Barley seed or grain that is capable of being processed and combined with iron without turning a distinctive gray color such as does proanthocyanidin-free barley, can be tested for this characteristic. The method involves making a slurry with 20 grams of the barley, finely ground, along with 160 to 180 grams of water, and 10 milligrams of iron as ferrous sulfate heptahydrate at a pH of 5.0 or greater. The slurry is then heated to a temperature above 50° C. Finely ground wheat flour or rice flour can be used as a control along with or in place of a control consisting of a slurry of finely ground barley and water without the added iron. Absence of gray coloration in the heated, iron-fortified slurry indicates that the finely ground barley is suitable for use in an organoleptically acceptable barley composition fortified with iron.

As used herein, the term "iron compound" comprises any one of what has been described in the art as iron compounds that are freely water-soluble, soluble in dilute acid, poorly soluble in dilute acid, or encapsulated iron compounds other than those coated with zinc stearate (see Hurrell, *Nutrition Rev.* 55:210–222, 1997 and Hurrel, Nonelemental sources, in *Iron Fortification of Foods,* Clydesdale and Wiemer, editors, 1985, p.39–53) or the highly bioavailable iron sources defined by Mehansho et al. (supra). Thus, the term "iron compound" comprises ferrous sulfate, ferric sulfate, ferrous gluconate, ferrous lactate, ferric ammonium citrate, ferric saccharate, ferrous saccharate, ferric citrate, ferrous citrate, ferrous amino acid chelates, ferrous fumarate, ferrous succinate, ferrous tartrate, elemental iron powders made by carbonyl, electrolytic or reduction techniques, ferric pyrophosphate, ferric orthophosphate, ferric ammonium orthophosphate, as well as mixtures of these compounds.

The amount of one or more of these iron compounds that is added to a food is the quantity sufficient to fortify the food with a nutritionally effective amount of iron in a serving. The serving size for various foods and age groups is based on the reference amounts customarily consumed per eating occasion defined by the Food and Drug Administration (Code of Federal Regulations, Title 21, Section 101.12). A nutritionally effective amount of iron is an amount of an iron compound that is capable of adding iron to the diet to aid in restoring iron balance in an iron-deficient individual. In general, a nutritionally effective amount will comprise more than about 3% of the Recommended Dietary Allowance (RDA) for the age group for which the food is intended and preferably from about 10% to about 50% of the RDA and up to about 100% of the RDA. In the case of infants, the RDA for iron is 10 mg for the first six months and 15 mg for the second six months. The Reference Daily Intake is 15 mg for infants. Thus an infant cereal containing a nutritionally effective amount of an iron compound will preferably contain at least about 3% or from about 0.3 mg to about 0.45 mg of an iron compound per serving, about 10% to about 50% or from about 1 mg to about 1.5 mg of an iron compound to about 5 mg to about 7.5 mg of an iron compound per serving up to about 100% or from about 10 mg to about 15 mg of an iron compound per serving calculated on the basis of the dry, instant form of the cereal composition prior to reconstitution with water or milk.

Particularly relevant to the present invention are additional authoritative recommendations and requirements for minimum iron contents in certain grain-based foods. The Committee on Nutrition of the American Academy of Pediatrics (Pediatric Nutrition Handbook, Second Edition, 1985, p.30) indicates that a single serving of infant cereal, made with 14 grams to 15 grams of instant infant cereal, provides about 7 milligrams of iron, thereby being equivalent to about 50 milligrams of iron per 100 grams of instant infant cereal. For many grain-based foods by use by the general population, the U.S. Food and Drug Administration has established "standards of identity." Enriched flour (Code of Federal Regulations, Title 21, Section 137.165) is required to contain 20 milligrams of iron per pound, equivalent to about 4.5 milligrams of iron per 100 grams. The Standard of Identity for enriched corn meal (21CFR137.260) requires this food to contain no less than 13 mg of iron and no more than 26 mg of iron per pound, equivalent to a range of no less than 3 to no more than 6 mg of iron per 100 g. The Standard of Identity for enriched farina (21CFR137.305) requires this food to contain not less than 13 mg of iron per pound. Thus, iron-fortified grain-based foods in the U.S. range in iron content from 3 mg to 6 mg for those grain-based foods intended for general use up to 50 mg per 100 g for those grain-based foods specifically intended for infants.

An organoleptically acceptable food preparation possesses a color that is deemed to be suitable for consumption. As judged on a 9-point hedonic scale, an organoleptically acceptable food preparation is scored as 5.0 or greater.

When the compositions of the present invention are to be used in a baby food, the compositions are prepared in an acceptable baby-food formulation. The terms acceptable baby-food formulation are used interchangeable herein with the terms acceptable baby-food composition and acceptable baby-food preparation. An acceptable baby-food formulation is one suitable for feeding to a baby and included within the meaning of the terms acceptable baby-food formulation is any regulatory agency requirements for foods intended for consumption by infants. For example, lactic acid and malic acid have been reviewed by the Food and Drug Administration and determined not to be generally recognized as safe for use in foods for infants (see 21 C.F.R. §184.1061, §184.1069). Thus, these acids would not be incorporated into an acceptable baby-food formulation. On the other hand, the use of citric acid and phosphoric acid have been determined to be generally recognized as safe. (See 21 C.F.R. §184.1033, §182.1073). Therefore, these acids can be incorporated into an acceptable baby-food formulation.

An acceptable baby-food formulation is also a formulation whose overall combination of organoleptic characteristics, i.e., taste, mouthfeel/texture, odor and color/appearance is of such a nature that the infant will consume and not reject the formulation and the caregiver will serve the formulation to the infant. For example, infants are known to display an aversion to bitter tastes at a very early age and to strong flavors such as can be present in some vegetables. (Trahms, in *Nutrition in Infancy and Childhood,* Pipes and Trahms, Eds, Mosby, St. Louis, 1993, pp. 181–194; Kajiura et al, *Developmental Psychobiol* 25:375–386; Rosenstein et al., *Child Develop* 59:1555–1568, 1988; Lowenberg, in *Nutrition in Infancy and Childhood,* Pipes and Trahms, Eds, Mosby, St. Louis, 1993, pp. 165–180; Brooks, supra; Lawless, supra; Ashbrook et al, *J Nutrition Ed* 17:5, 6, 46, 1985; Beal *Pediatrics* 20:448–456, 1957). Therefore, an acceptable formulation of a baby-food composition does not have a strong bitter taste or a strong flavor such as can be present in some vegetable preparations.

An acceptable baby-food formulation will also have a texture that is acceptable to the baby. For example, foods that are too dry or gritty are usually unacceptable to infants. In general, acceptable baby-food formulations will be smooth in texture. In addition, younger infants typically prefer food that is soft and homogenous. For older infants, however, a nonhomogenous texture may be desired.

Because of such preferences, baby foods are typically produced in different forms, depending on the age of the intended consumer. For example, Beech-Nut Stage 1 products are intended to be consumed by infants from about three months of age. Beech-Nut Stage 2 products, which are strained and will pass through a 0.50 orifice, are intended to be consumed by infants from about six months of age. Infants of about eight or nine months of age and older are the intended consumers of Beech-Nut Stage 3 Junior products, which have chunky components that will pass through a ⅜ inch screen.

Preferably, the desired texture is achieved using the whole food concept by mixing whole food components having the desired texture. Moreover, the color and appearance of the formulation are such that the infant or the adult caregiver will not reject the formulation. Acceptable colors tend to be light rather than dark. Preferably, acceptable color is achieved using the whole food concept in which food components are added which produce the desired color for the overall mixture. The appearance of the formulation should also be smooth and homogenous.

In addition, the composition should not produce adverse side effects such as acid indigestion, diarrhea, allergic responses or the like.

Testing a food composition in general or a baby-food composition in particular for organoleptic acceptability can be readily performed by the skilled artisan using routine methods such as those described in Example 7 below. For example, since the adult perception of bitter tastes closely follows that in the infant (Lawless, *J. Am. Diet. Assoc.* 85:577–585, 1985) and since food preferences or aversions of the adult caring for the infant are known to influence which foods are offered to the infant (Trahms, in *Nutrition in Infancy and Childhood,* Pipes and Trahms, Eds, Mosby, St. Louis, 1993, pp. 181–194; Brooks, The Wall St J, Dec. 4, 1996 pp A1, A6), it is possible to conduct acceptability testing of baby-food compositions in adults. Standard testing procedures for sensory evaluation are known in the art (see, for example, Stone and Sidel in *Sensory Evaluation Practices,* Academic Press, Orlando, 1985, pp 58–86, 227–252).

Testing for organoleptic acceptability in infants could be conducted, for example, after obtaining informed consent from parents in a double-blind, randomized controlled study. Infants of ages from about 4 months to about 12 months would be fed a series of baby-food compositions and the adult feeding the infant would then record acceptability and tolerance including amount offered, amount consumed and amount refused by the babies. Acceptability rating would be performed by methodology known in the art (for example, Stone and Sidel, supra). The results would be analyzed and compositions showing acceptance comparable to or greater than that of the reference baby food would be considered organoleptically suitable for use as an infant food.

INDUSTRIAL APPLICATION

The compositions and methods of the present invention provide an appealing, natural-appearing color for a barley-containing food composition. These compositions provide the additional benefit of supplying nutritionally relevant amounts of iron in the diet which in the present food composition does not cause an undesirable graying of the composition. The improvement in organoleptic quality of the present barley food compositions is achieved through use of barley from a proanthocyanidin-free cultivar of barley. The compositions and methods of this invention are particularly applicable for use in commercial baby-food preparations. In such preparations, the improved color gives the preparation a more natural-like appearance which is more acceptable to the infant and caregiver.

Preferred embodiments of the invention are described in the following examples. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This example illustrates the tendency of a barley cereal containing electrolytic iron to turn gray upon reconstitution.

Ten grams of commercial barley Cereal (Gerber Products Company, Fremont, Mich., USA) were mixed with one gram of a salt trituration of either ferrous sulfate heptahydrate, a freely water-soluble iron compound; ferrous fumarate, an iron compound soluble in dilute acid; or the electrolytically reduced iron of small particle size used for U.S. infant cereal fortification and designated by the manufacturer (OMG Americas, Research Triangle Park, USA) as "A-131." One gram of each trituration delivered 5 milligrams of iron. Regular table salt was added to the no-iron control. The instant infant barley cereal was made into a cereal pap with distilled water according to the manufacturer's label instructions.

Over time, all three samples to which additional iron were added turned gray. Added ferrous sulfate turned the color of the cereal pap gray within seconds; added ferrous fumarate and electrolytic iron turned the color gray within one hour. Thus, iron fortification of a barley-containing food product can lead to an undesirable gray color of the food product whether the iron compound added is recognized to have good bioavailability or not.

EXAMPLE 2

This example illustrates the lack of effectiveness of acidification of an iron-fortified barley food composition in preventing discoloration due to the presence of the iron.

Slurries were made by blending 20 grams of barley flour and 140 grams of water. Where indicated, the water contained 10 milligrams of iron from 50 milligrams of ferrous sulfate heptahydrate and 0% to 1.0% of citric acid, expressed as a percentage of the flour. The slurry was heated to 60° C. to 70° C. in a microwave oven and the resulting porridge was blended to redistribute the gelatinized flour. The hot porridge was poured into a Mason jar and retorted for 45 minutes at 121° C.

The color of the porridge samples was measured by matching with color samples in the Pantone Color Formula Guide 1000, 1995 Edition. The values reported are the percentage of the transparent weight in the color sample, a measure of lightness, immediately upon opening the sealed jars and nine hours later. barley flour porridge containing iron darkens over time in contact with air. The results given in Table 1 show that avoidance of the darkening effect of iron occurs only at a citric acid level that creates an unacceptable tartness. The pH of the unacidified barley flour porridge is already within the ranges taught by Mehansho et al., but the unacidified iron-fortified barley flour porridge is organoleptically unacceptable as it is definitely gray and substantially darker than barley flour porridge made without added iron.

TABLE 1

| Sample | pH | Taste | Color at 0 hr. | Color at 9 hr. |
|---|---|---|---|---|
| no iron, no citric acid | 5.30 | Bland | 98.5 | 96.8 |
| + iron, 0% citric acid | 5.09 | Bland | 89.0 | 75.0 |
| + iron, 0.2% citric acid | 4.63 | Slightly tart | 92.0 | 87.5 |
| + iron, 0.4% citric acid | 4.30 | Tart, unpleasant | 98.0 | 93.7 |
| + iron, 0.6% citric acid | 4.12 | Sour | 98.5 | 96.8 |
| + iron, 0.8% citric acid | 3.93 | Sour | 98.5 | 96.8 |
| + iron, 1.0% citric acid | 3.78 | Very sour | 98.5 | 96.8 |

EXAMPLE 3

The following example illustrates the absence of gray color following addition of ferrous sulfate to cereal grain porridge prepared from Caminant barley flour, rice flour and wheat flour.

Whole barley flour, white rice flour, whole-grain rye and intact oat groats were obtained from a local health food store. Unenriched wheat flour was obtained from a local grocery store. Caminant barley was obtained from Sejet Plantbreeding, Horsens, Denmark. The intact grains—rye, oat groats and Caminant barley—were made into a coarse flour by repeated grinding in a blender until the material passed through a screen with 16×32 openings per square inch.

Slurries were made by blending 20 grams of ground grain or flour, 178 grams of water and either 2 grams of a sodium chloride trituration of 2.5% ferrous sulfate providing 10 mg of iron or 2 grams of regular sodium chloride. Sodium chloride was found to be a useful and inert carrier for ferrous sulfate heptahydrate. This level of iron—10 mg per 20 g of flour—is the level of iron added to instant infant cereals. The pH of each slurry was measured. Each slurry was then heated for 2 minutes at high setting in a microwave oven to a temperature in excess of 50° C. The resulting porridge was then blended to redistribute the gelatinized flour. The hot porridge was poured into a Mason jar and the color observed over time. The results are shown in Table 2.

TABLE 2

| Flour | FeSO₄ | pH | Porridge color |
|---|---|---|---|
| Commercial barley flour | none | 5.28 | Light tan |
| Commercial barley flour | added | 5.07 | Gray |
| "Caminant" barley, home-ground | added | 5.69 | Tan |
| Commercial wheat flour | added | 5.77 | Light tan |
| Commercial white rice flour | added | 5.84 | White |
| whole-grain rye, home-ground | added | 6.06 | Dirty tan, slightly gray |
| oat groats, home-ground | added | 5.71 | V. light tan |

Porridge made with normal barley flour turned a distinct and unattractive gray in the presence of soluble iron added as ferrous sulfate. The porridge made with ground Caminant barley had no grayness.

These observations indicate that the tested samples of wheat flour, rice flour and oat groats do not turn gray following addition of iron compound. As stated above, Bravo (1998) reported that, per 100 grams of dry weight, barley contains 1200 to 1500 mg of total polyphenols, compared to 22 to 40 mg for wheat, 30.9 mg for corn, 8.7 mg for oats and 8.6 mg for rice. Thus, grains containing small amounts of polyphenolic compounds do not produce a gray color following addition of iron compound.

EXAMPLE 4

This example illustrates of absence of gray color following addition of ferrous fumarate to cereal grain porridge prepared from Caminant barley flour compared to a typical commercially available barley flour.

The same regular commercial whole barley flour and coarsely ground Caminant barley used in Example 3 were used in this example. Slurries were made by blending 20 grams of ground grain or flour, 178 grams of water and either 2 grams of a sodium chloride trituration of 1.5% ferrous fumarate providing 10 mg of iron or 2 grams of regular sodium chloride. Sodium chloride was found to be a useful and inert carrier for ferrous fumarate. This level of iron was equivalent to 50 mg per 100 g of flour. Ferrous fumarate was provided by Gallard-Schlesinger Industries, Inc., Carle Place, N.Y., USA.

Each slurry was then heated for 2 minutes at high setting in a microwave oven to a temperature in excess of 60° C. The resulting porridge was then blended to redistribute the gelatinized flour. The hot porridge was poured into a Mason jar and the color observed over time. The results are shown in Table 3.

TABLE 3

| Flour | Ferrous fumarate | pH | Porridge color |
|---|---|---|---|
| commercial barley flour | none | 5.27 | Light tan |
| commercial barley flour | added | 5.30 | Slightly but definitely gray |
| "Caminant" barley, home-ground | none | 6.08 | Tan, no gray |
| "Caminant" barley, home-ground | added | 5.98 | Tan, no gray, slightly darker than no-iron control |

The porridge made with normal barley flour turned a distinct and unattractive gray in the presence of the slightly soluble iron compound ferrous fulmarate. The porridge made with ground Caminant barley and added ferrous fumarate had no grayness. The Caminant barley porridge to which ferrous fumarate was added was slightly darker than the Caminant barley porridge with no added ferrous fumarate, but the direct visual comparison of Caminant barley porridge with and without ferrous fumarate indicated no gray color visually detectable in the Caminant barley porridge with added ferrous fumarate.

EXAMPLE 5

This example illustrates the absence of gray color in porridges made with Caminant barley when barley comprises 50% or 10% (w/w, dry basis) of the flour in the porridge.

The whole barley flour, white rice flour and coarsely ground Caminant barley used in Example 3 were used in this example. Slurries were made by blending 20 grams of ground grain or flour, 178 grams of water and either 2 grams of a sodium chloride trituration of 1.5% ferrous fumarate providing 10 mg of iron or 2 grams of a sodium chloride trituration of 2.5% ferrous sulfate heptahydrate providing 10 mg of iron. This level of iron was equivalent to 50 mg per 100 g of flour. The flour components consisted of 18 grams of white rice flour and 2 grams of barley for the 10% barley samples and 10 grams of white rice flour and 10 grams of barley for the 50% barley samples.

Each slurry was then heated for 2 minutes at high setting in a microwave oven to a temperature in excess of 50° C.

The resulting porridge was then blended to redistribute the gelatinized flour. The hot porridge was poured into a Mason jar and the color observed at thirty minutes after the initiation of the microwave heating. The color results are shown in Table 4.

TABLE 4

| Porridge flour composition | Iron added as ferrous sulfate | | Iron added as ferrous fumarate | |
|---|---|---|---|---|
| | "Caminant" barley | Commercial barley flour | "Caminant" barley | Commercial barley flour |
| 50% barley | Light tan | Medium dark gray | Medium tan | Medium gray |
| 10% barley | Off-white | Light gray | Slight off-white | Very light gray |

The porridges made with normal barley flour had a definite and unattractive gray color in the samples made with both the slightly soluble iron compound ferrous fumarate and the highly soluble iron compound ferrous sulfate, even though the normal barley flour representing just one-half and one-tenth of the flour used to make the porridge. The porridges made with ground Caminant tannin-free barley were a tan color at the 50% barley level and off-white at the 10% barley level.

EXAMPLE 6

This example illustrates the absence of gray color in Caminant barley porridge in the presence of one of three iron compounds (ferrous sulfate, ferrous fumarate and electrolytic iron) in comparison to barley porridge made from typical commercially available malted barley flour.

Commercial flours are much finer than the coarse flour made in a home blender. Example 6 was done to ensure that the difference between regular barley flour and home-ground Caminant barley in their reaction with iron was not due to differing particle size distributions and also to evaluate three commonly used iron compounds with differing solubility characteristics.

Caminant barley was obtained from Sejet Plantbreeding, Horsens, Denmark. Intact, low-color (Lovibund 1.3 to 2.3) Carafoam 2-row barley malt produced by Weyermann, Germany, was obtained from a local specialty shop. Both intact barley grains were made into a coarse flour by grinding in a blender until the material passed through a screen with 16×32 openings per square inch.

Slurries were made by blending 20 grams of ground grain, 178 grams of water and 2 grams of one of three sodium chloride triturations providing 10 mg of iron and containing either 2.5% ferrous sulfate heptahydrate, 1.5% ferrous fumarate or 0.5% electrolytically reduced iron A-131. Control slurries were made with 2 grams of regular sodium chloride. Each slurry was then heated for 2 minutes at high setting in a microwave oven to a temperature in excess of 50° C. The resulting porridge was then blended to redistribute the gelatinized flour. The hot porridge was poured into a Mason jar and the color observed over time. The results are shown in Table 5.

TABLE 5

| Home-ground grain | Iron compound | pH | Porridge color within minutes |
|---|---|---|---|
| Malted barley | None | 5.58 | Dark brown |
| Malted barley | Ferrous Sulfate | 5.29 | Black |
| Malted barley | Ferrous Fumarate | 5.48 | Dark gray |

TABLE 5-continued

| Home-ground grain | Iron compound | pH | Porridge color within minutes |
|---|---|---|---|
| Malted barley | Electrolytic Iron | 5.59 | Dark brown with gray cast |
| "Caminant" barley | None | 6.13 | Medium tan |
| "Caminant" barley | Ferrous Sulfate | 5.68 | Medium tan |
| "Caminant" barley | Ferrous Fumarate | 6.12 | Medium tan |
| "Caminant" barley | Electrolytic Iron | 6.10 | Medium tan |

Barley porridge made with the coarsely ground malted barley developed unattractive, dark colors in the presence of iron added as ferrous sulfate, ferrous fumarate or electrolytic iron. Barley porridge made with coarsely ground Caminant tannin-free barley had no grayness with any of these three iron compounds, even after standing for eight hours.

EXAMPLE 7

This example illustrates the absence of gray coloration in enriched biscuits prepared with Caminant barley flour and ferrous fumarate compared to biscuits prepared from typical commercially available malted barley and ferrous fumarate.

Enriching cereal flour with ferrous flimarate is a nutritionally advantageous means of improving the iron status of a population as demonstrated by Layrisse et al. ("Early response to the effect of iron fortification in the Venezuelan population," American Journal of Clinical Nutrition, vol. 64, pp. 903–907, 1996). This example demonstrated that ferrous fumarate can be used to enrich barley flour for the general population without undesirable changes in the appearance of foods made therefrom by employing the present invention.

Caminant barley was obtained from Sejet Plantbreeding, Horsens, Denmark. Intact, low-color (Lovibund 1.3 to 2.3) Carafoam 2-row barley malt produced by Weyermann, Germany, was obtained from a local specialty shop. Both intact barley grains were made into coarse flour by grinding in a blender until the material passed through a screen with 16×32 openings per square inch.

Simple biscuits were made with the following recipe, using either coarsely ground Caminant barley or coarsely ground Carafoam malted barley as the source of barley. The level of iron addition was 5 milligrams for the total of 100 grams of the two flours, wheat plus coarsely ground barley, used in the recipe. This addition level would satisfy the standard of identity for enriched flour with respect to iron enrichment. The results are shown in Table 6.

TABLE 6

| Ingredient | Amount |
|---|---|
| Wheat flour | 50 grams |
| Barley, coarsely ground | 50 grams |
| Sugar | 5 grams |
| Baking powder | 6 grams |
| Salt containing ferrous fumerate, 5 mg of iron per gram | 1 gram |
| Vegetable shortening | 30 grams |
| Whole milk | 80 grams |

The biscuits were made as follows. The first five dry ingredients were combined and the shortening was then cut into the dry ingredients. The milk was added and the ingredients were beaten together in a bowl to form a dough. The dough was rolled into a layer approximately one-half inch thick. The dough was then cut with a biscuit cutter, placed on a baking sheet and baked at 450° F. for about 23 minutes.

The resulting biscuit food product made with Carafoam malted barley had a darker and less appetizing interior color. The biscuit food product made with Caminant barley had a lighter, more natural and more attractive interior color.

EXAMPLE 8

This example illustrates the method that can be used for testing the organoleptic acceptability of the compositions of the present invention.

The taste-testing of the iron-containing food compositions of the present invention can be performed using a 9-point hedonic scale. A panel of trained taste testers are given food samples to taste and rate on the following scale:

| Score/rating | Std. Hedonic Scale |
|---|---|
| 9 | I like extremely |
| 8 | I like very much |
| 7 | I like moderately |
| 6 | I like slightly |
| 5 | I neither like nor dislike |
| 4 | I dislike slightly |
| 3 | I dislike moderately |
| 2 | I dislike very much |
| 1 | I dislike extremely |

Mean values for the scored ratings by the test panel are determined for each sample. Those samples having a mean value of 5.0 or greater for taste acceptability are considered organoleptically acceptable compositions.

All references cited in this specification are hereby incorporated by reference. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

What is claimed is:

1. A food composition comprising at least 10% (w/w, dry basis) proanthocyanidin-free barley and a nutritionally effective amount of an iron compound in an organoleptically acceptable formulation.

2. The food composition according to claim 1 wherein the barley is from a Caminant, Chamant, Gant, Clarity or Brite variety or from a combination thereof.

3. The food composition according to claim 2 wherein the barley is from the Caminant variety.

4. The food composition according to claim 1 wherein the iron compound comprises from about 3 mg to about 50 mg iron compound per 100 g (w/w, dry basis).

5. The food composition according to claim 4 wherein the iron compound comprises ferrous sulfate, ferric sulfate, ferrous gluconate, ferrous lactate, ferric ammonium citrate, ferric saccharate, ferrous saccharate, ferric citrate, ferrous citrate, ferrous amino acid chelates, ferrous fumarate, ferrous succinate, ferrous tartrate, elemental iron powders made by carbonyl, electrolytic or reduction techniques, ferric pyrophosphate, ferric orthophosphate, ferric ammonium orthophosphate, or mixtures thereof.

6. The food composition according to claim 5 wherein the iron compound comprises ferrous fumarate.

7. A method for making an organoleptically acceptable proanthocyanidin-free barley food composition fortified with iron comprising combining at least 10% (w/w, dry basis) barley composition with a nutritionally effective amount of an iron compound.

8. The method according to claim 7 wherein the barley is from a Caminant, Chamant, Gant, Clarity or Brite variety or from a combination thereof.

9. The method according to claim 8 wherein the barley is from the Caminant variety.

10. The method according to claim 7 wherein the food composition comprises from about 3 mg to about 50 mg iron compound per 100 g (w/w, dry basis).

11. The method according to claim 10 wherein the iron compound comprises ferrous sulfate, ferric sulfate, ferrous gluconate, ferrous lactate, ferric ammonium citrate, ferric saccharate, ferrous saccharate, ferric citrate, ferrous citrate, ferrous amino acid chelates, ferrous fumarate, ferrous succinate, ferrous tartrate, elemental iron powders made by carbonyl, electrolytic or reduction techniques, ferric pyrophosphate, ferric orthophosphate, ferric ammonium orthophosphate, or mixtures thereof.

12. The method according to claim 11 wherein the iron comprises ferrous fumarate.

13. A method for restoring iron balance in an individual having iron deficiency, the method comprising feeding the individual a food composition comprising at least 10% (w/w, dry basis) proanthocyanidin-free barley and a nutritionally effective amount of an iron compound in an organoleptically acceptable formulation.

14. The method according to claim 13 wherein the barley is from a Caminant, Chamant, Gant, Clarity or Brite variety or from a combination thereof.

15. The method according to claim 14 wherein the barley is from the Caminant variety.

16. The method according to claim 13 wherein the iron compound comprises from about 3 mg to about 50 mg iron compound per 100 g (w/w, dry basis).

17. The method according to claim 16 wherein the iron compound comprises ferrous sulfate, ferric sulfate, ferrous gluconate, ferrous lactate, ferric ammonium citrate, ferric saccharate, ferrous saccharate, ferric citrate, ferrous citrate, ferrous amino acid chelates, ferrous fumarate, ferrous succinate, ferrous tartrate, elemental iron powders made by carbonyl, electrolytic or reduction techniques, ferric pyrophosphate, ferric orthophosphate, ferric ammonium orthophosphate, or mixtures thereof.

18. The method according to claim 17 wherein the iron comprises ferrous fumarate.

* * * * *